(12) United States Patent
Eggers et al.

(10) Patent No.: US 6,981,063 B1
(45) Date of Patent: Dec. 27, 2005

(54) METHOD FOR TIME SYNCHRONIZATION OF A COMPUTER NETWORK, AND COMPUTER NETWORK WITH TIME SYNCHRONIZATION

(75) Inventors: Harald Eggers, Vierkirchen (DE); Juergen Schucht, Munich (DE); Richard Sturm, Rosenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/889,649

(22) PCT Filed: Jan. 14, 2000

(86) PCT No.: PCT/EP00/00326

§ 371 (c)(1),
(2), (4) Date: Sep. 10, 2001

(87) PCT Pub. No.: WO00/44194

PCT Pub. Date: Jul. 27, 2000

(30) Foreign Application Priority Data

Jan. 19, 1999 (EP) .................................. 99100899

(51) Int. Cl.[7] .............................................. G06F 1/04
(52) U.S. Cl. .................. 709/248; 709/248; 709/208; 709/223; 370/498; 713/375
(58) Field of Search ................................ 709/228, 248, 709/208, 223, 224; 370/498, 503, 516, 517

(56) References Cited

U.S. PATENT DOCUMENTS

| | | | | |
|---|---|---|---|---|
| 4,530,091 A | * | 7/1985 | Crockett ...................... 370/229 |
| 5,408,506 A | * | 4/1995 | Mincher et al. ............ 375/134 |
| 5,428,645 A | * | 6/1995 | Dolev et al. ................. 375/354 |
| 5,448,557 A | * | 9/1995 | Hauber ........................ 370/396 |
| 5,517,505 A | * | 5/1996 | Buchholz et al. ........... 370/350 |
| 5,579,513 A | * | 11/1996 | Strohmer ..................... 713/600 |
| 5,721,738 A |   | 2/1998 | Kubota et al. |
| 5,912,886 A | * | 6/1999 | Takahashi et al. .......... 370/350 |
| 5,918,040 A | * | 6/1999 | Jarvis .......................... 713/375 |
| 6,023,725 A | * | 2/2000 | Ozawa et al. ............... 709/219 |
| 6,038,237 A | * | 3/2000 | Tsuruta et al. .............. 370/468 |
| 6,199,169 B1 | * | 3/2001 | Voth ............................ 713/400 |
| 6,223,286 B1 | * | 4/2001 | Hashimoto .................. 713/178 |
| 6,278,710 B1 | * | 8/2001 | Eidson ........................ 370/394 |
| 6,351,821 B1 | * | 2/2002 | Voth ............................ 713/600 |
| 6,556,573 B1 | * | 4/2003 | Kaaresoja ............... 370/395.64 |
| 6,590,881 B1 | * | 7/2003 | Wallace et al. ............. 370/332 |
| 6,725,278 B1 | * | 4/2004 | Gonzalez .................... 709/248 |

OTHER PUBLICATIONS

David L. Mills, Improved algorithms for synchronizing computer network clocks, IEEE/ACM Transactions on Networking, vol. 3, Issue 3 (Jun. 1995), pp.: 245-254.*

(Continued)

Primary Examiner—Glenton B. Burgess
Assistant Examiner—Scott M. Klinger
(74) Attorney, Agent, or Firm—Bell Boyd & Lloyd LLC

(57) ABSTRACT

A method for time synchronization of a computer network by a main computer, in which case, for synchronization with an N-th interrupt, a time signal corresponding to the instant of the interrupt plus a time interval between the interrupts is transmitted on an ATM bus and the secondary computers to be synchronized set their clock to this transmitted time signal with the next interrupt.

16 Claims, 2 Drawing Sheets

OTHER PUBLICATIONS

Klaus Schossmaier, An interval-based framework for clock rate synchronization, Proceedings of the sixteenth annual ACM symposium on Principles of distributed computing, pp.: 169-178, 1997.*

XP 000532997 Performance Analysis of Synchronization Communication Protocols for Real-Time multimedia Services pp. 256-260.

XP 000496553 A Service Oriented Approach to Continuous Media Synchronization —pp. 936-943.

XP 000625029 Distributed Source Destination Synchronization pp. 1341-1347.

* cited by examiner

METHOD FOR TIME SYNCHRONIZATION OF A COMPUTER NETWORK, AND COMPUTER NETWORK WITH TIME SYNCHRONIZATION

BACKGROUND OF THE INVENTION

1. Field of the Invention

The present invention relates to a method for time synchronization of a computer network, preferably of a switching computer system, including at least one main computer (Master) with, in each case, at least one assigned secondary computer (slave), each computer being provided with at least one internal clock, and the computers being connected via at least one ATM bus (ATM=asynchronous transfer mode).

Furthermore, the present invention relates to a computer network, preferably a switching computer system, including at least one main computer (Master) with, in each case, at least one assigned secondary computer (Slave), each computer being provided with at least one internal clock, and the computers being interconnected via at least one ATM bus.

2. Description of the Prior Art

At present there is no known prior art for real-time process computer systems, particularly switching computer systems, in which time synchronization of the participating computers in the computer network is achieved with an accuracy with regard to date and time of day of at least +/- 50 msec and a relative time stamp of at least +/-1 msec. The currently used switching computer systems such as, for example, the applicant's switching computer system EWSD or EWSX, are achieved either as mono-processor systems or strictly coupled multi-processor systems. With this type of configuration, particular time synchronization is inherently given on account of the strict coupling of the processors, or of the just one processor that is present.

In the course of general development, however, distributed real-time process computer systems are also intended to be used as switching computer systems. The requirement for charge registration necessitates the process computers situated in the process computer system to be provided with a synchronized time, with regard to date and time of day, which has a maximum error of +/-50 msec. This requirement is substantiated by the charge registration since the charge registration creates tickets with a time indication at all the computer components of the distributed system. Furthermore, it is necessary, on account of the internal data transport protocol of the distributed system, to achieve a relative time stamp, or a counter, with an accuracy of at least +/-1 msec for all the computers in the network system. The relative resolution of such a time stamp, that is to say the time spacing from one counter to the next counter, typically lies in a range of about 10 msec. The time stamp is required in order to measure message throughput times in the system, so as to analyze incorrect behavior or to carry out performance analyses in the distributed system, with the aid of system tracers. In order for the events from the trace results to be correctly assigned with respect to time, a system-wide synchronized time of day, that is to say a correspondingly exact time stamp, is likewise required.

It is an object of the present invention, therefore, to present a method for time synchronization of a computer network, preferably of a switching computer system, and a corresponding computer network, preferably a corresponding switching computer system, which achieves time synchronization for date/time of day of at least +/-50 msec and for a general relative time stamp of at least +/- 1 msec, using no direct connection between the individual computers, but rather only the ATM bus.

SUMMARY OF THE INVENTION

With regard to the present invention's method for time synchronization of a computer network, preferably of a switching computer system, including at least one main computer (Master) and, in each case, at least one assigned secondary computer (Slave), each computer being provided with at least one internal clock, and the computers being connected via at least one ATM bus (ATM=asynchronous transfer mode), at least the following method steps are proposed:

- the at least one main computer transmits, with an N-th interrupt of a sequence of interrupts which are transmitted at a fixed time interval $\Delta t$, via the ATM bus a synchronization message (Sync) with a time indication (TOD), the time indication corresponding to the time of the main computer at the instant of the N-th interrupt plus the time interval $\Delta t$;
- the at least one secondary computer reads, with good probability, the synchronization message via the ATM bus, sets its internal clock to the communicated time with the occurrence of the next interrupt and transmits, via the ATM bus, a success message (Ack) with an identifier of the secondary computer to the main computer;
- the main computer reads the success message and decides, on the basis of the message propagation time, whether the success message was transmitted at the right time;
- in the case of correctly timed transmission, the corresponding secondary computer is defined as synchronized; and
- in the case of non-correctly timed transmission, the corresponding secondary computer is defined as unsynchronized.

In accordance with an alternative embodiment of the method according to the present invention, there may also occur between the interrupts outlined above further interrupts which are not taken into account in the method for time synchronization.

In accordance with the concept of the present invention, the main computer, with the (N+2)-th interrupt, can again carry out time synchronization in accordance with the abovementioned method in order for secondary computers that were possibly non-synchronized during the first scan through the time synchronization to be synchronized via the renewed performance of the time synchronization. Moreover, after a certain period of time has elapsed, differences in running of the individual hardware clocks of the individual computers of the computer network can give rise to a relative deviation in the timekeeping of the individual computers, thereby necessitating renewed synchronization.

It goes without saying that these time synchronizations can be repeated at specific predetermined intervals in order to keep the computer network permanently time-synchronized.

In accordance with the method according to the present invention, an identification mechanism for synchronized or non-synchronized computers can be established in the main computer, in which a specific secondary computer is deemed to be synchronized if the success message arrives at the main computer between the (N+1)-th and the (N+2)-th interrupt.

In this way, the main computer (in each cases without setting up any other particular connections to the secondary computers) can identify which secondary computers are in the synchronized state or in the non-synchronized state.

A typical magnitude of the time interval Δt at which the synchronization interrupts are transmitted is 23.5 msec. The typical accuracy of the time interval Δt is better than a few nsec, on which, however, the pure program run time, which lies in the region of a few μsec, is superposed.

A further embodiment according to the present invention involves further main computers being provided in the computer network which, in turn, have a superordinate computer, at least with regard to the system time, and are synchronized with one another according to the abovementioned method. This makes it possible for even a relatively large computer network having, for example, a number of clusters, each including a main computer and a plurality of subordinate secondary computers, to be synchronized in such a way that the main computers are first synchronized with regard to their system time and then in turn the independently synchronize, in accordance with the above-mentioned method—their assigned secondary computers.

However, it should be pointed out that it is also possible, in a computer network in which all the computers are interconnected via an ATM bus, to define a single main computer which carries out the time synchronization via the ATM bus, so that all, that is to say all further main computers and all secondary computers, are synchronized with this time synchronization message. If a main computer which does not itself trigger the time synchronization wishes to identify whether its secondary computers assigned to it are now time-synchronized, then it is possible for it to monitor the ATM bus with regard to the success messages of the individual secondary computers and, accordingly, to decide whether or not the secondary computers assigned to it are time-synchronized.

Advantageously, the communicated time may also include the date and, in a particular embodiment, the ATM bus may be an AMX bus.

In addition to the method of the present invention, it is proposed, in accordance with a further concept of the present invention, to configure a computer network known per se, preferably of a switching computer system, including at least one main computer (Master) with, in each case, at least one assigned secondary computer (Slave), each computer being provided with at least one internal clock, and the computers being connected via at least one ATM bus (ATM=asynchronous transfer mode), to the effect that:

the at least one main computer is provided with a transmitter which transmits, with an N-th interrupt of a sequence of interrupts which are transmitted at a fixed time interval Δt, via the ATM bus a synchronization message (Sync) with a time indication (TOD), the time indication corresponding to the time of day of the main computer at the instant of the N-th interrupt plus the time interval Δt;

the at least one secondary computer is provided with a part for reading the synchronization message via the ATM bus, its internal clock being set to the communicated time with the occurrence of the next interrupt, and has a transmitter for transmitting a success message (Ack) with an identifier of the secondary computer to the main computer via the ATM bus;

the main computer has a part for reading the success message and is provided with a decision part which, on the basis of the message propagation time, decides whether the success message was transmitted at the right time;

in the main computer a memory is provided in which there is stored, in the case of correctly timed transmission, the definition of the corresponding secondary computer as synchronized; and in the case of non-correctly timed transmission, the definition of the corresponding secondary computer as unsynchronized.

According to the present invention, there may also be provided, in addition to the interrupts provided for the time synchronization, further interrupts which are not taken into account during the time synchronization.

In a particular embodiment of the computer network, it may furthermore be provided that the main computer include a repetition function which, with the (N+2)-th interrupt, again performs the time synchronization. This is particularly important if the time synchronization is intended to be maintained over a relatively long period of time.

In accordance with a particular embodiment of the inventive computer network, it is proposed that the decision part of the main computer defines a specific secondary computer as synchronized if the success message arrives at the main computer between the (N+1)-th and the (N+2)-th interrupt. A typical magnitude of the time interval between the interrupts may be specified as 23.5 msec.

In accordance with the method outlined above, further main computers may also be provided in the computer network, which, in turn, have a superordinate computer, at least with regard to the system time, and are synchronized with one another according to the abovementioned method.

Furthermore, it may be advantageous if the communicated time contains not only just the time of day but also the date.

In another embodiment of the computer network of the present invention, the ATM bus may be an AMX bus.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
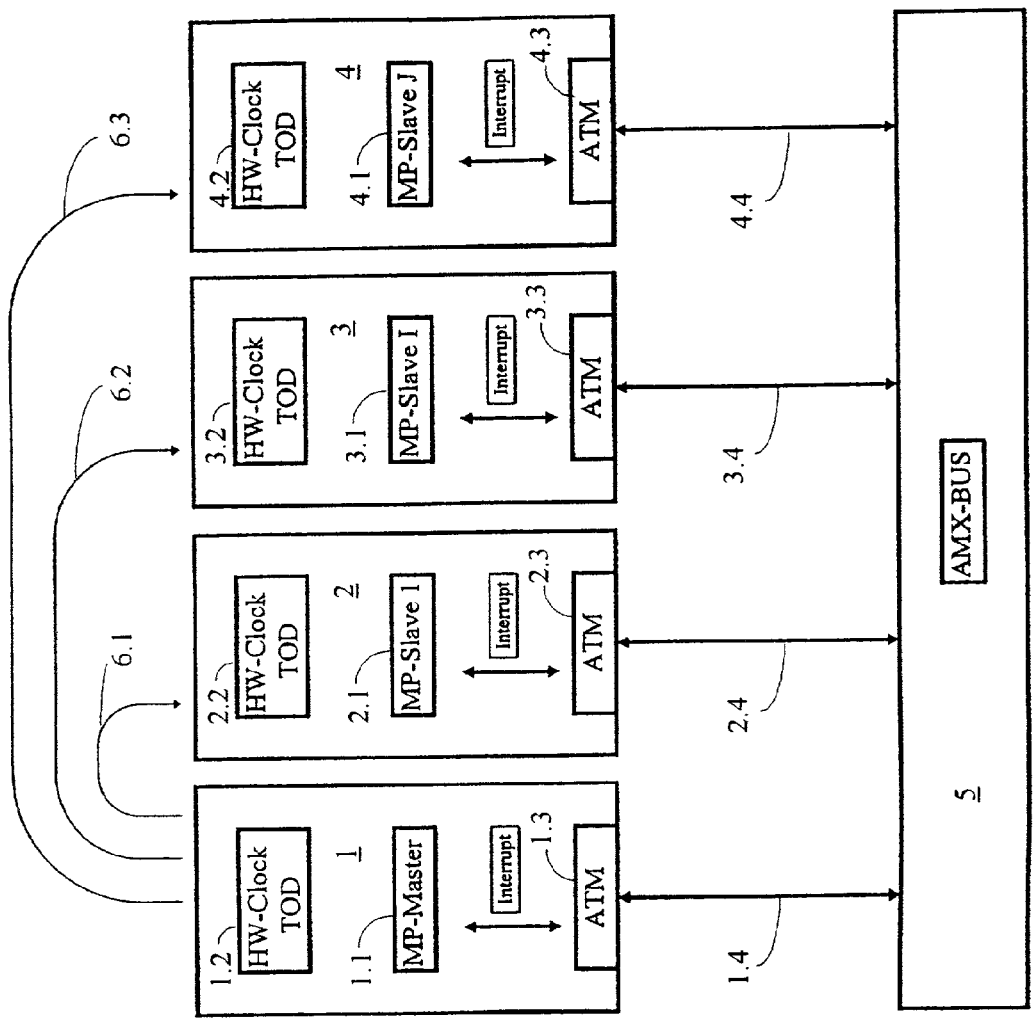
FIG. 1 shows schematic illustration of a computer network.

FIG. 1 shows a schematic illustration of a computer network having four computers 1 to 4 illustrated by way of example. The computer 1 represents the main computer (Master) 1, which is provided with a processor (MP-Master=Main Processor Master) 1.1, a crystal-controlled clock (HW-Clock=Hardware Clock) 1.2 and an interface 1.3 to an AMX bus 5 via the ATM connecting line 1.4.

Also shown are the secondary computers 2 to 3, which are each likewise equipped with a processor 2.1 to 4.1, a clock 2.2 to 4.2 and an ATM interface 2.3 to 4.3. The secondary computers 2 to 4 are also, in each case, connected to the AMX bus 5 via an ATM connecting line 2.4 to 4.4.

The connecting arrows 6.1 to 6.3 are intended to illustrate that the time synchronization to be carried out acts on the secondary computers 2 to 4 in a manner proceeding from the main computer 1.

Figure 2:
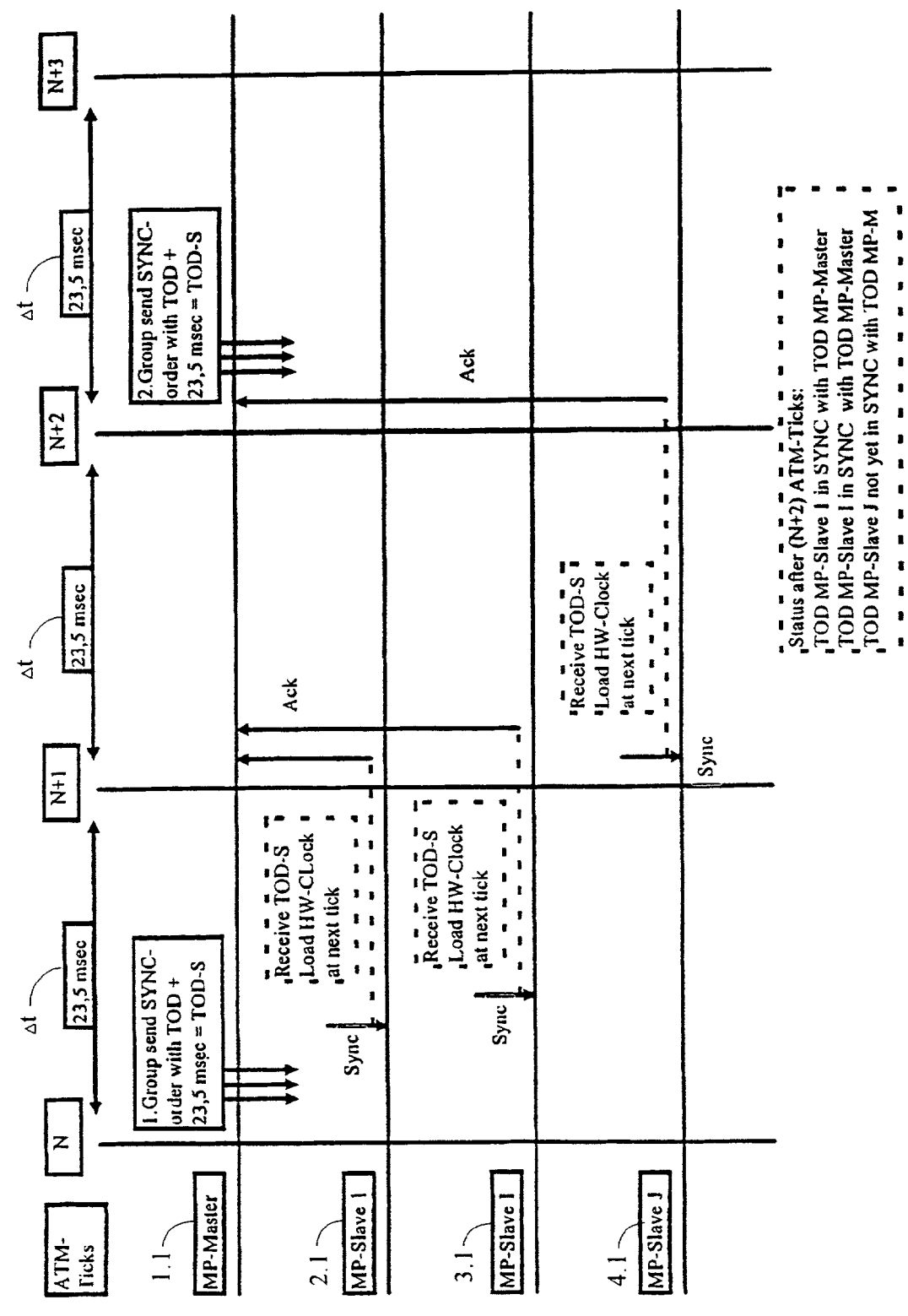
FIG. 2 shows an illustration of the method sequence according to the present invention against the time axis.

FIG. 2 shows the time profile of the present invention's method for time synchronization, which can be carried out using the computer network from FIG. 1. The time axis t is shown running from left to right. The four computers with their processors 1.1 to 4.1 are listed in a manner arranged from top to bottom. The time synchronization interrupts (ATM ticks) are specified in the topmost line along the time axis, said the interrupts having the interrupts N to N+3 at a time interval Δt of 23.5 msec. With the first interrupt N, the main computer 1 sends a synchronization message with the current time TOD at the instant of the N-th interrupt plus 23.5 msec (TOD-S). This sent time TOD-S thus corresponds to the instant at which the (N+1)-th interrupt occurs. In the time profile, the synchronization message (Sync) is read both at the secondary computer 2 and at the secondary computer 3. After receiving this synchronization message, the two computers 2 and 3 set their internal clocks 2.2 and 3.2 to the communicated time TOD-S with start beginning at the (N+1)-th interrupt. In addition, after the (N+1)-th interrupt, they send a success message (Ack) to the main computer 1 with the information that the synchronization message was received and the time on the internal clock was set correspondingly. However, the third secondary computer 4 receives the synchronization message only after the (N+1)-th interrupt, with the result that it sets its internal clock to the communicated time only for the next interrupt; that is, for an interrupt that is too late. Consequently, its system time has an error of Δt=23.5 msec. Accordingly, it also sends the success message to the main computer only after the (N+2)-th interrupt.

Thus, between the (N−1)-th and the (N+2)-th interrupt, the main computer registers that the two secondary computers 2 and 3 have synchronized their internal clocks 2.2 and 3.2, in accordance with the synchronization message (Sync), while no success message (Ack) has yet been transmitted by the secondary computer 3. Consequently, the main computer knows that only the secondary computers 2 and 3 have been correctly synchronized with regard to their time setting, while the fate of the computer 3 remains open. Once the main computer receives the success message of the secondary computer 3 after the (N+2)-th interrupt, the main computer knows that this computer was definitely not synchronized correctly. With the (N+2)-th interrupt, or in the case of the next even-numbered interrupt, the main computer once again sends a second group of synchronization messages with the current time at the instant of the (N+2)-th interrupt plus 23.5 msec to the non-synchronized secondary computer 4 of the computer network and the synchronization of the secondary computer 4 with the subsequent signaling to the main computer starts from the beginning. In addition, the following cycles may be used to synchronize other as yet unsynchronized computers (not illustrated here).

If this method is repeated often enough, all the secondary computers are time-synchronized with the main computer. In this case, the inaccuracy of the time setting does not depend on the time profile of the message from the main computer to the secondary computer, but rather is merely dependent on the accuracy of the time interval Δt between the individual interrupts. Since the uncertainty of this time interval lies in the region of a few nsec, the time synchronization via the method described above is also extremely accurate and, thus, at any rate corresponds to the requirements of +/−50 msec with regard to the communicated time of day including date.

If, in addition to the sent time of day, a time stamp (that is to says a counter) is also sent with the synchronization message, the resolution of which time stamp is in the region of a few milliseconds, then the method described above also makes it possible to set the relative time stamp of the computers of the entire computer network with an accuracy lying in the region of the resolution of the time stamp.

Consequently, the method described satisfies the requirements with regard to the synchronization time (date/time of day: +/−50 msec, relative time stamp: +/−1 msec).

Although the present invention has been described with reference to specific embodiments, those of skill in the art will recognize that changes may be made thereto without departing from the spirit and scope of the invention as set forth in the hereafter appended claims.

What is claimed is:

1. A method for time synchronization of a switching computer system having at least one main computer with, in each case, at least one assigned secondary computer, each main and secondary computer being respectively provided with at least one internal clock and being connected via at least one ATM bus, the method comprising the steps of:
    transmitting, via the at least one main computer and along the ATM bus, with an N-th interrupt of a sequence of interrupts which are transmitted at a fixed time interval, a synchronization message with a time indication, the time indication corresponding to a time of day of the main computer at an instant of the N-th interrupt plus the fixed time interval;
    reading, via the at least one secondary computer, the synchronization message via the ATM bus;
    setting, via the at least one secondary computer, the internal clock of the at least one secondary computer to the communicated time indication upon the occurrence of next interrupt;
    transmitting, via the at least one secondary computer and along the ATM bus, a success message with an identifier of the secondary computer to the main computer;
    reading, via the main computer, the success message;
    deciding, via the main computer, based on a message propagation time, whether the success message was transmitted at a proper time;
    defining, in the case of a correctly timed transmission, the corresponding secondary computer as synchronized; and
    defining, in the case of a non-correctly timed transmission, the corresponding secondary computer as unsynchronized.

2. A method for time synchronization of a switching computer system as claimed in claim 1, wherein, between the interrupts of the sequence of interrupts, further interrupts can occur which are not taken into account in the time synchronization method.

3. A method for time synchronization of a switching computer system as claimed in claim 1, wherein the main computer, with the (N+2)-th interrupt, again performs the time synchronization method.

4. A method for time synchronization of a switching computer system as claimed in claim 1, wherein a specific secondary computer is defined as synchronized if the success message arrives at the main computer between the (N+1)-th and the (N+2)-th interrupt.

5. A method for time synchronization of a switching computer system as claimed in claim 1, wherein the time interval is 23.5 msec.

6. A method for time synchronization of a switching computer system as claimed in claim 1, wherein the switching computer system includes further main computers which, in turn, have a superordinate computer at least with regard to system time, the further main computers being synchronized with one another as with the main and secondary computers.

7. A method for time synchronization of a switching computer system as claimed in claim 1, wherein the communicated time indication also contains a date.

8. A method for time synchronization of a switching computer system as claimed in claim 1, wherein the ATM bus is an AMX bus.

9. A switching computer system, comprising:
- at least one main computer having at least one internal clock;
- at least one secondary computer having at least one internal clock, the at least one secondary computer being assigned to the at least one main computer;
- at least one ATM bus connecting the at least one main and the at least one secondary computers;
- wherein the at least one main computer transmits, with an N-th interrupt of a sequence of interrupts which are transmitted at a fixed time interval, via the ATM bus, a synchronization message with a time indication, the time indication corresponding to a time of day of the main computer at the instant of the N-th interrupt plus the fixed time interval;
- wherein the at least one secondary computer reads the synchronization message via the ATM bus, its respective internal clock being set to the communicated time indication upon occurrence of a next interrupt of the sequence, and transmits a success message with an identifier of the secondary computer to the main computer via the ATM bus;
- wherein the main computer reads the success message and decides, based on a message propagation time, whether the success message was transmitted at a proper time;
- wherein, in the case of a correctly timed transmission, a definition of the corresponding secondary computer as synchronized is stored in a memory of the main computer; and
- wherein, in the case of a non-correctly timed transmission, a definition of the corresponding secondary computer as unsynchronized is stored in the memory.

10. A switching computer system as claimed in claim 9, wherein between the interrupts of the sequence of interrupts, further interrupts can occur which are not taken into account in time synchronization.

11. A switching computer system as claimed in claim 9, wherein the main computer includes a repetition part which, with the (N+2)-th interrupt, again performs time synchronization.

12. A switching computer system as claimed in claim 9, wherein the main computer defines a specific secondary computer as synchronized if the success message arrives at the main computer between the (N+1)-th and the (N+2)-th interrupt.

13. A switching computer system as claimed in claim 9, wherein the fixed time interval is 23.5 msec.

14. A switching computer system as claimed in claim 9, further comprising:
- further main computers which, in turn, have a superordinate computer at least with regard to system time, the further main computers being synchronized with one another as with the main and secondary computers.

15. A switching computer system as claimed in claim 9, wherein the communicated time indication also contains a date.

16. A switching computer system as claimed in claim 9, wherein the ATM bus is an AMX bus.

* * * * *